United States Patent [19]

Bolton, III et al.

[11] 3,912,622
[45] Oct. 14, 1975

[54] SCREENING MACHINE WITH LIGHTS REMOVAL

[75] Inventors: Joseph A. Bolton, III, North Attleboro; Peter Edmund LeBlanc, Walpole, both of Mass.

[73] Assignee: Bird Machine Company, Inc., South Walpole, Mass.

[22] Filed: May 30, 1974

[21] Appl. No.: 474,362

[52] U.S. Cl. .................. 209/17; 209/240; 209/273; 209/306; 210/304; 210/415; 233/2; 233/46
[51] Int. Cl.² ........................................... B07B 1/20
[58] Field of Search .......... 209/273, 270, 240, 306, 209/300, 17; 210/415, 304; 233/2, 11, 46, 27; 162/55

[56] References Cited
UNITED STATES PATENTS

| | | | |
|---|---|---|---|
| 2,395,286 | 2/1946 | Merle | 233/27 |
| 3,363,759 | 1/1968 | Clarke-Pounder | 209/273 |
| 3,437,204 | 4/1969 | Clarke-Pounder | 209/273 |
| 3,458,038 | 7/1969 | Young | 209/306 |
| 3,726,401 | 4/1973 | Bolton | 209/240 |

*Primary Examiner*—Frank W. Lutter
*Assistant Examiner*—Gregory N. Clements
*Attorney, Agent, or Firm*—Edgar H. Kent

[57] ABSTRACT

A screening machine is disclosed for separating solid particles in liquid slurry and for separating such particles of low density from the remainder of the slurry, wherein a tubular screen has a rotor therein with a substantially closed surface opposite the screen forming with it a screening zone. Pumping means is provided to recirculate through the interior of the rotor to the inlet to the screening zone reject slurry which has passed through the screening zone. The slurry flows within the rotor interior as a vortex in the inner part of which the low density particles concentrate, and this inner part of the vortex is removed from the machine through an outlet having a mouth extending into the vortex.

10 Claims, 3 Drawing Figures

U.S. Patent   Oct. 14, 1975   Sheet 1 of 2   3,912,622

SCREENING MACHINE WITH LIGHTS REMOVAL

BACKGROUND OF THE INVENTION

1. Field of the Invention

This invention relates to machines for screening solid particles such as paper-making fibers from liquid slurries, and also for selectively separating lower density particles or "lights" from such slurries.

2. Description of the Prior Art

In screening slurries of paper-making fibers containing secondary fibers from waste stocks, the rejects from the screen frequently contain a large amount of contaminants of lower density than the fiber, such as plastics, glue, rubber bands, string, tape and the like. If the rejects are to be reprocessed and used rather than discarded, as is generally desirable, these low density lights need to be separated, since they are primary contaminants which may be comminuted in further refining so that they will pass the screens and foul the paper. Efforts to remove these lights with centrifugal separators such as hydrocyclones have not been as effective as desired, and involve additional expensive equipment to supplement the screens.

SUMMARY OF THE INVENTION

An object of this invention is to provide a screening machine which will effectively separate lights from acceptable material such as paper-making fiber passing the screen and from other reject material such as fiber shives not passing the screen.

Another object is to provide such a screening machine which can be operated without plugging at low reject removal rates or even without reject removal, in which latter case the machine functions as a defibering machine, breaking down the fiber bundles until they all pass the screen.

A further object is to provide such a screening machine which can be built and operated at little additional expense as compared with an existing screening machine.

Our U.S. Pat. No. 3,726,401 discloses a screening machine having a substantially closed rotor providing pulses to a surrounding screen, in which means is provided for causing rejects from the screen to recirculate through the rotor to the inlet end of the screening compartment formed by the passage between rotor and screen. Such recirculation is advantageous both in preventing plugging by reject build-up even at low reject rates, and in increasing the proportion of acceptable fiber that is able to pass the screen.

It has now been discovered that as the reject slurry is recirculated through the high speed rotating rotor, it flows as a vortex about and along the rotor axis, and that if lights are present in the rejects they segregate under the centrifugal force toward the central core of the vortex to such an extent that an effective separation of the lights from the reject slurry can be made simply by separately removing the inner part of the vortex containing the lights from the machine.

The invention provides, in a machine of the patented type mentioned, a separate outlet for lights with an inlet having its mouth extending partially into the vortexing reject slurry recirculating through the machine rotor to remove the inner part of the vortex from the machine. By this means an effective separation of the lights is obtained, particularly if the proportion of reject slurry from the screen that is recirculated through the rotor is kept high, since any lights avoiding the outlet therefor on a first pass are likely to be caught therein and removed on a subsequent recirculation. Rotor speeds usual for screening are adequate to form the requisite vortex in the reject slurry recirculating through the rotor.

In preferred embodiments, the discharge end of the lights outlet is of restricted cross-section relative to its inlet end, so that the open core of the vortexing slurry at the inlet is closed as the slurry approaches the discharge end, providing an uncored discharge stream and reducing pressure drop. The outer surface formation of the rotor may be as most desirable for screening or defibering, the lobed or bumped rotor surfaces disclosed in U.S. Pat. No. 3,726,401 aforesaid being generally preferred. If increased defibering is desired, defibering blades or bars may be provided on the rotor.

As in said patent, the rotor may be used as a pump to effect the recirculation of reject slurry through it simply by providing one or more slurry inlets into the rotor at its end adjacent the outlet end of the screening compartment, and one or more slurry outlets from the rotor at its end adjacent the inlet end of the screening compartment and further from the axis of the rotor than the slurry inlets therein. The rotor end adjacent the inlet end of the screening compartment may be open, forming a single outlet for the recirculated slurry, or that end of the rotor may be closed, with openings in the rotor providing the slurry outlets. In preferred embodiments the rotor end or an extension thereof adjacent the inlet end of the screening compartment has an outlet arrangement which exerts a pumping action on the stock and inhibits undesirable reverse flow of feed slurry into the rotor.

DESCRIPTION OF THE PREFERRED EMBODIMENTS

Figure 1:
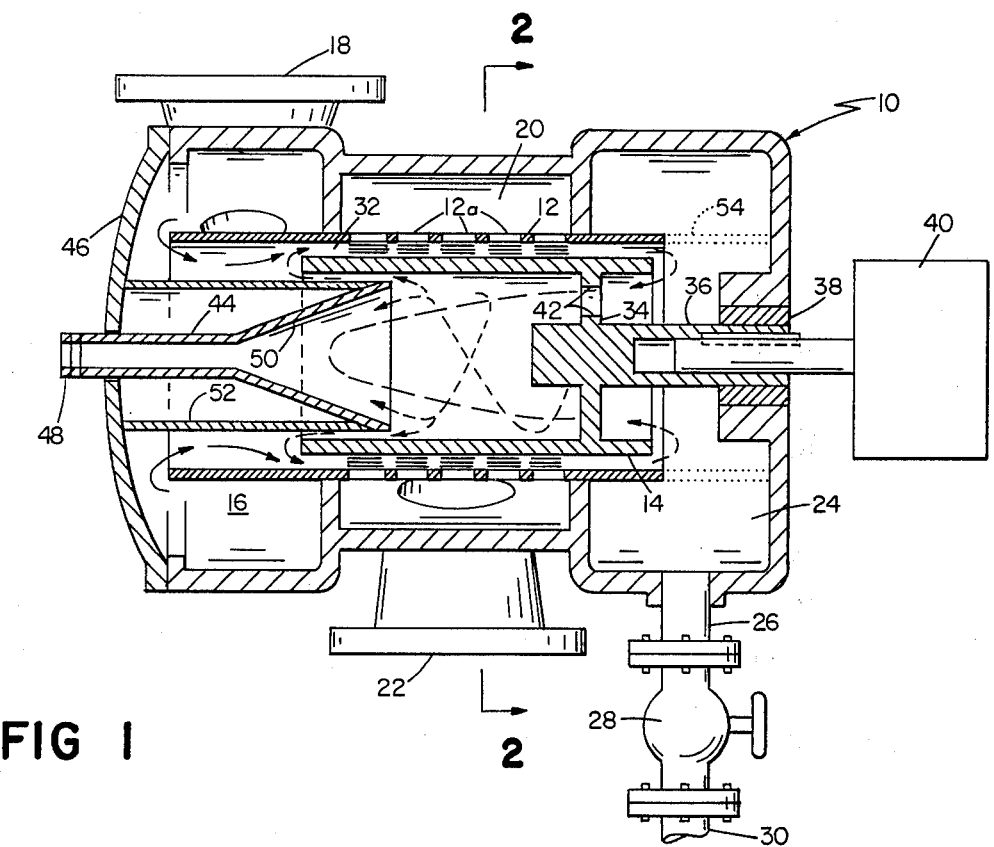
FIG. 1 is a vertical longitudinal cross-section view of a machine according to the invention, indicating a modification by dotted lines.
Figure 2:
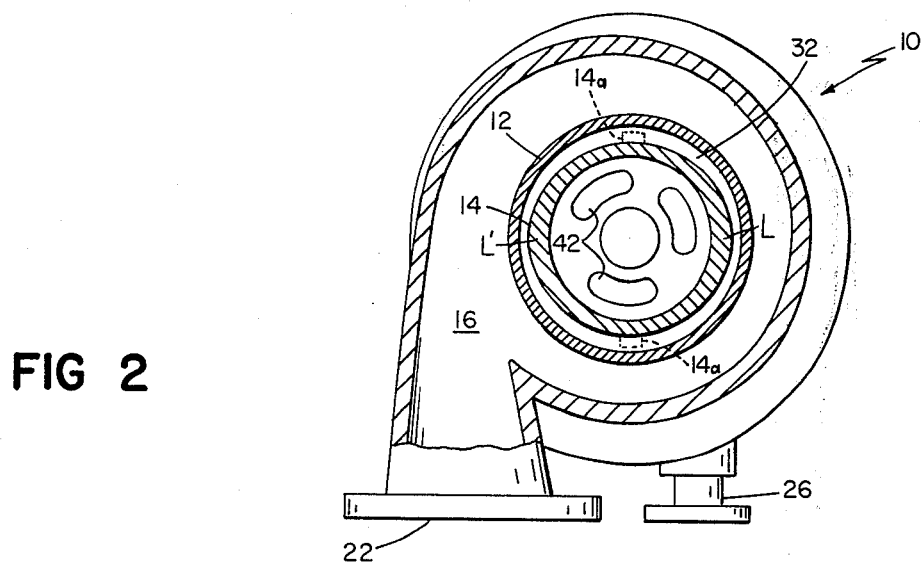
FIG. 2 is a vertical transverse cross-section view on line 2—2 of FIG. 1 with reject valve omitted and with a modification indicated by dotted lines.
Figure 3:
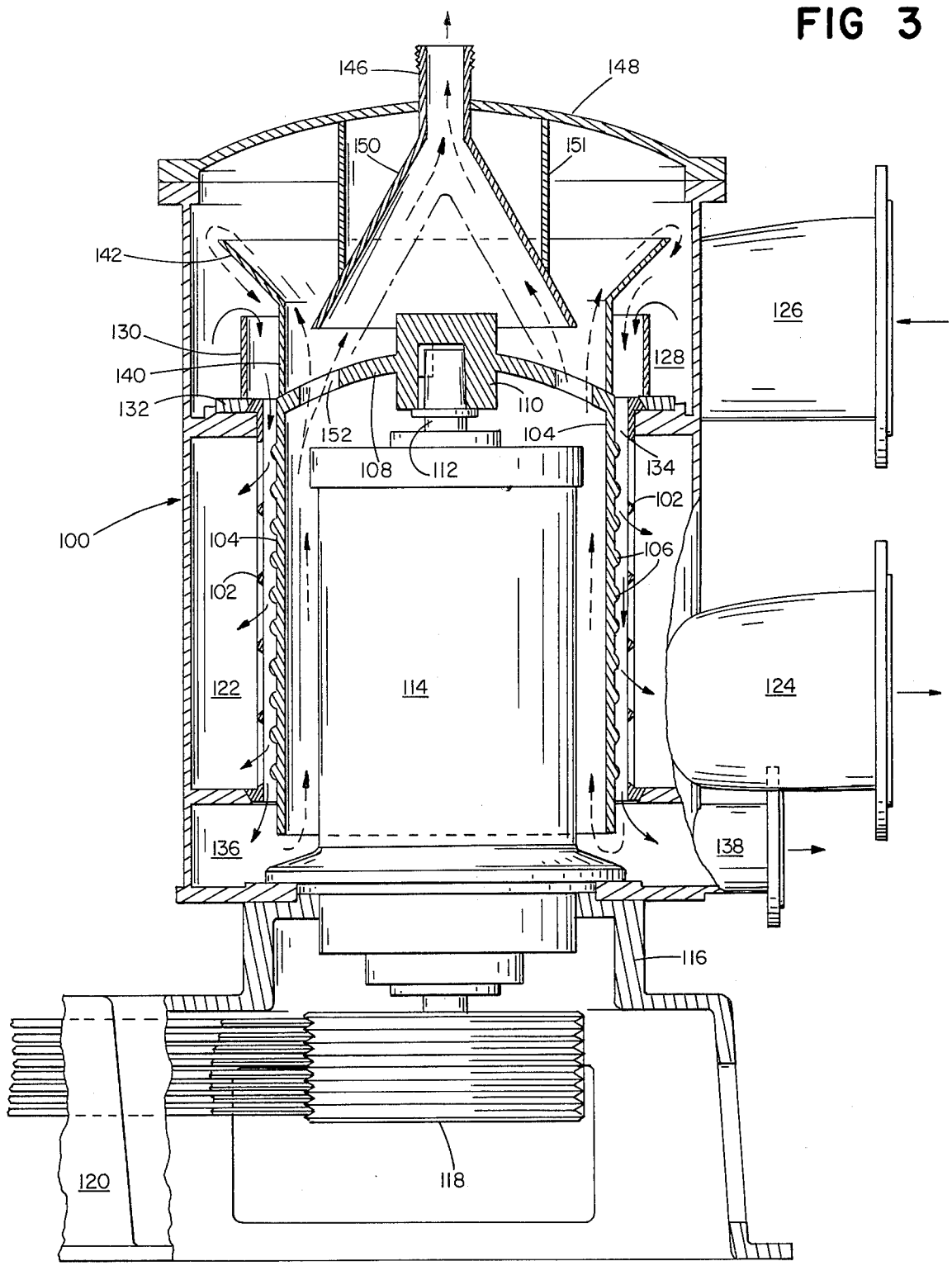
FIG. 3 is a view partly in vertical section, partly in side elevation, of another embodiment.

Referring to FIGS. 1 and 2, which show a machine similar to that shown in FIGs. 1–3 of aforesaid U.S. Pat. No. 3,726,401 modified according to the present invention, a pressure casing 10 contains a generally cylindrical screen 12 and a rotor 14 coaxially mounted within screen 12 and having a substantially closed surface opposite the screen.

The casing with the screen plate fitted therein defines a supply channel 16 connected to inlet spout 18, an accepts zone 20 defined on the outside of the screen plate 12, connected to accepts spout 22, and a rejects zone indicated as gutter 24 connected to rejects outlet pipe 26, thence through valve 28 to connected pipe 30 of a discharge system. If desired, a timer (not shown) may be connected to valve 28 for intermittent operation of the reject discharge system.

Between the screen 12 and surface of rotor 14 is defined screening zone 32. The screen as shown is of the slotted plate type, having a multiplicity of elongated narrow slots 12a therein.

The rotor 14 is hollow and provided with an internal web 34 near the reject end of the machine. To this web is connected shaft 36 which supports rotor 14 within the screen in cantilever fashion. Shaft 36 passes through seal 38 and bearing assemblies (not shown) to a drive motor 40, which may be reversible to permit rotation of the rotor in either clockwise or counterclockwise direction.

Rotor 14 has an external surface configuration such as to induce positive and negative pulses at the opposed screen surfaces, the negative pulses, opposite the direction of accepts flow through the screen, having a screen cleaning action by dislodging oversize particles from the screen surface. In this embodiment, the rotor is provided for this purpose with two lobes h and h' extending the full length thereof, which can be seen at right and left of the rotor axis as viewed in FIG. 2, of semicircular formation about centers spaced equally to right and left of the rotor axis in FIG. 2. Thus the lobes are eccentric to the rotor axis, having high points centrally to right and left of the rotor axis in FIG. 2 and low points centrally above and below that axis. The rotor is positioned so that the lobes have a slight clearance (e.g. ¼th inch) from the inner surface of the screen.

As the lobe portions of the rotor 14 which are closest to the screen rotate past slots 12a, a positive outward pulse is created which advances through the slots, carrying with it components which are smaller than the slots while solids larger than the slots are restrained. With these portions suitably close to the screen the flow assisting forces of the rotor acting on the fluid are significant.

The screen cleaning effect of the rotor is achieved just after the rotor surface portions closest to the screen pass the slots, which creates a negative inward pressure pulse producing a back flow tendency sufficient to unseat oversize debris particles from the slots and draw them toward the rotor. The debris particles are then affected by the feeding movement of the stock (which has an axial component, progressing from the supply to the various slots), this tending to move the debris in the direction of the rejects zone and ultimately into reject gutter 24.

Normally, valve 28 is adjusted to permit continual discharge of a small portion of the reject slurry in gutter 24. However, the valve may be opened only periodically to purge debris from the gutter.

The lobes of the rotor also have a desirable defibering or deflaking action on oversize fiber bundles. If it is desired to increase this type of action, defibering projections may be secured to the rotor surface such as the two rectangular bars indicated at 14a by dotted lines in FIG. 2, extending longitudinally of the rotor in the low areas of the lobes and having a thickness about equal to the difference in radius of the high and low points of the lobes.

The base web 34 of rotor 14 is provided with openings 42 therethrough, three being shown in FIG. 2 arranged symmetrically about the rotor axis. These openings are closer to the rotor axis than is the opposite open end of the rotor and serve to pump slurry rejected by the screen through the open end of the rotor to screening zone 32, in accordance with U.S. Pat. No. 3,726,401 aforesaid.

In accordance with this invention, there is provided at the inlet end of the machine a stationary outlet pipe 44 extending at one end through a sealed opening in cover 46 of casing 10, and provided at that end with threading 48 for connection to suitable discharge piping and shut-off and control valving (not shown). The other end of pipe 44 has a frusto-conical extension 50 which extends into the open end of rotor 44 and has the periphery of its mouth in spaced proximity to the surrounding interior wall of the rotor. A cylindrical baffle member 52 is secured at one end around the periphery of the inlet mouth of extension 50 and has its opposite end seated against the inner surface of cover 46.

In operation, feed slurry entering channel 16 from inlet spout 18 overflows the end of screen 12 and flows into the inlet to screening zone 32, as indicated by the full line arrows in FIG. 1. Slurry rejected by the screen enters openings 42 in the adjacent end of the rotor and is pumped thereby toward the open end of the rotor. Within the rotor, the slurry is forced by the rotation of the rotor to flow in a vortical path or as a vortex around the rotor axis as indicated by dashed line arrows in FIG. 1. As also indicated by the dashed line arrows, as the vortex reaches the mouth of inlet extension 50 it splits into an inner portion nearest the rotor axis which enters extension 50, and an outer portion nearest the rotor wall which flows through the annular passage between baffle member 52 and the inner wall of the rotor, out the end of the rotor and into screening zone inlet 32 for recycling.

Due to centrifugal forces of the vortex, the rejected lights component of the slurry concentrates in the inner portion of the vortex which enters extension 50, while the rejected fiber component thereof concentrates in the outer portion which is recirculated to inlet 32. As the inner portion flows into extension 50, its vortical flow slows and stops as it contracts, closing the end of the air core within the vortex in the rotor which is indicated by the dash line curve in FIG. 1. The flow out of pipe 44 is therefore uncored and continuous. Baffle member 52 serves to prevent short-circuiting flow of feed slurry into the open end of the rotor both by reducing the accessible area for such flow and by increasing the velocity of outward flow from the rotor end. As an alternate, the end of the rotor may be closed by a rotary seal around extension 50 and recirculation openings provided in the end of its side wall. However, the baffle arrangement shown is preferred.

In case the slurry make-up is such that the rejects from the screen consist essentially only of lights and oversize fiber bundles, the reject removal system may be shut off, the defibering action of the rotor being effective ultimately to break down the fiber bundles into fibers which will pass the screen. In such case, the volume of the rejects compartment is desirably reduced by providing a screen in which the unapertured skirt which defines with the rotor the outlet from the screening zone is extended to abut the end of the casing, as indicated by the dashed line extension 54 in FIG. 1, thus confining the reject compartment to the interior of the extension. Also in such case it may be desirable to provide the rotor with additional defibering devices such as the bars 14a.

Machines as described operate satisfactorily on slurries of consistencies of the order of 2% to 4.5%, with most of the fiber content passing through the screen as accepts, and most of the lights content, particularly plastic, which may constitute e.g. 3% to 15% of the solid content of the feed slurry, being eliminated through pipe 44. The inner diameter of the screen may, for example, be about 12 inches, the minimum clearance of the rotor therefrom of the order of ⅛th to ⅜ths inch and the rotor speed about 1800 RPM. Control of flow into inlet portion 50 of pipe 44 to insure that it receives substantially all and only the inner portion of the vortex containing the lights may be exercised both by the axial and radial extent of portion 50 into the vortex and by regulating flow from pipe 44.

FIG. 3 shows another embodiment similar to that of FIG. 4 of aforesaid U.S. Pat. No. 3,726,401 modified according to the present invention and to increase the pumping action of the rotor on the slurry flowing through it. FIG. 3 shows a construction desirable for larger capacity machines, in which the rotor is supported from its end adjacent the feed inlet and the machine is supported with the rotor axis vertical. In FIG. 1, the rotor axis is indicated as horizontal but the embodiments shown will function with the rotor axis horizontal, vertical or at any angle thereto.

In FIG. 3 the machine has a pressure casing 100 and a generally cylindrical screen 102 secured at its opposite ends to supporting rings within the casing. Screen 102 is shown as slotted like screen 12 but as in the case of screen 12 may be of round hole or other type. A rotor 104 is coaxially mounted within the screen and has a substantially closed surface opposite it which is shown as provided with a plurality of spaced bumps 106 which serve the same functions as the lobes of the rotor of the FIGS. 1 and 2 embodiment. Rotor 104 has a web 108 at its upper end carrying a central hub 110 keyed to one end of a rotary drive shaft 112 coaxial with the rotor. Shaft 112 is supported in bearings and seals (not shown) in a pedestal 114 supported on a base 116 which also supports casing 100 to which it is secured. Shaft 112 has a drive pulley 118 at its lower end within base 116 which is connected by sheave belts to a motor (not shown) mounted on a base beside the machine partially indicated at 120. Rotor 104 has an open lower end surrounding pedestal 114 and spaced therefrom.

The supporting rings for the screen define with the casing an accepts compartment 122 surrounding the screen with which outlet spout 124 communicates. A feed inlet spout 126 communicates tangentially with a feed compartment 128 defined within the upper end of casing 100 beyond the screen. An annular plate member 130 secured to an annular screen support member 132 defines the outer wall of an inlet to screening compartment 134 between the rotor and the screen. Below the screen and rotor, casing 100 defines a rejects compartment 136 into which the screening compartment opens and having a communicating outlet spout 138 for connection to valved outlet piping such as shown in FIG. 1.

Beyond web 108 rotor 104 is provided with an extension having a cylindrical portion 140 secured to the rotor which forms the inner wall of the inlet to screening compartment 134. Extension 140 terminates in a frusto-conical end portion 142 extending outwardly into the upper part of feed compartment 128. A slurry outlet pipe 146 extends through cover 148 of casing 100 and has a frusto-conical inlet portion 150 enlarging toward its mouth which extends into the chamber defined by rotor extension 140 and rotor web 108 coaxially with the rotor. Portion 150 is supported from cover 148 by support cylinder 151 which is attached thereto and to the cover, and pipe 146 is threaded at its outlet end for connection to discharge piping and valving (not shown) as in FIG. 1. Apertures 152 are provided in rotor web 108 to permit slurry flow into extension 140.

In operation, slurry fed to compartment 128 overflows member 130 into the inlet to screening compartment 134, thence flows downwardly through the screening compartment with acceptable fiber passing through the screen and with solid matter rejected by the screen discharging from the screening compartment into rejects compartment 136;—all as indicated by full line arrows in FIG. 3. The rotor extension has a pumping action causing slurry to flow from rejects compartment 136, upwardly into the space between the open lower end of the rotor and pedestal 114, thence upwardly through the rotor and openings 152 into portion 140 of the rotor extension where it flows as a vortex, the inner portion of which containing mainly the lights is captured by the mouth of inlet portion 150 of pipe 146 to exit through the pipe, while the outer portion of the vortex containing mainly fiber recirculates through the rotor extension portion 142 into feed compartment 128 and the inlet to screening compartment 134;—all as indicated by dashed line arrows in FIG. 3.

Rotor extension portion 142, with its outlet further from the rotor axis than the inlet into the open bottom of the rotor, exerts a strong pumping action on the stock, and the arrangement of its lip relative to the walls of the feed compartment provides a restricted outlet which acts similarly to the baffle member 52 of FIG. 1 in inhibiting undesired counterflow of feed into the rotor extension. If desired, these actions may be increased by providing a coaxial frusto-conical baffle member within portion 142, although this has been found in practice to be unnecesasry. As in the FIG. 1 embodiment, slowing of the vortical flow as it passes into inlet portion 150 terminates the air core as indicated by the dashed line, so that the lights fraction discharges as a solid stream.

We claim:

1. A screening machine for separating solid particles in liquid slurry containing the same and for separating such particles of low density therefrom which comprises:

a tubular screen;

a rotor mounted within the screen coaxially thereof having a substantially closed surface opposite the inner screen surface and rotatable about the screen axis to define with said screen surface a slurry screening zone having an inlet and an outlet;

an accepts compartment opposite the outer surface of said screen;

a slurry inlet for supplying slurry to be screened to said screening zone inlet;

pumping means for causing slurry to be recirculated by the rotation of said rotor from the outlet to the inlet of said screening zone through the interior of said rotor as a vortex flowing about the axis of the rotor toward the inlet to said screening zone, comprising a rotor inlet for admitting slurry into said rotor adjacent said screening zone outlet and a rotor outlet for discharging slurry from said rotor adjacent said screening zone inlet, and separating means for removing from said machine an inner portion of a said vortex having concentrated therein said low density particles, comprising slurry discharge means having an inlet end positioned in said rotor in spaced relation to the rotor ends and inner wall such as to intercept and discharge through said discharge means said inner portion of a said vortex while leaving the remainder free to flow to said rotor outlet.

2. A screening machine according to claim 1 which includes a reject outlet for removing from the machine a portion of the slurry passing through said screening zone outlet.

3. A screening machine according to claim 1 wherein said rotor outlet has a frusto-conical end portion enlarging outwardly from the rotor axis toward its discharge end.

4. A screening machine according to claim 1 wherrein the surface of said rotor facing said screen comprising lobes eccentric to the axis of said rotor.

5. A screening machine according to claim 4 wherein the surface of said rotor facing said screen comprises defibering projections.

6. A screening machine according to claim 1 wherein the surface of said rotor facing said screen comprises a plurality of spaced bumps.

7. A screening machine according to claim 1 wherein said rotor inlet is positioned closer to the rotor axis than said rotor outlet.

8. A screening machine according to claim 1 wherein said inlet end of said discharge means is annular and coaxial with said rotor.

9. A screening machine according to claim 8 wherein said inlet end of said discharge means is frusto-conical and convergent in the direction of flow therethrough.

10. A screening machine according to claim 9 wherein said inlet end of said discharge means is surrounded by a cylindrical-baffle defining with the inner wall of said rotor an annular passage for flow of the outer portion of said vortex toward said rotor outlet.

* * * * *

UNITED STATES PATENT AND TRADEMARK OFFICE
CERTIFICATE OF CORRECTION

PATENT NO. : 3,912,622

DATED : October 14, 1975

INVENTOR(S) : Joseph A. Bolton, III and Peter Edmund LeBlanc

It is certified that error appears in the above-identified patent and that said Letters Patent are hereby corrected as shown below:

Column 3, line 17, change "h and h'" to --L and L'--.

Signed and Sealed this sixth Day of January 1976

[SEAL]

Attest:

RUTH C. MASON
*Attesting Officer*

C. MARSHALL DANN
*Commissioner of Patents and Trademarks*